Nov. 4, 1924.
W. A. LORENZ
1,514,059
APPARATUS FOR SEPARATING MOLTEN GLASS INTO MOLD CHARGES
Filed May 3, 1922
4 Sheets-Sheet 4
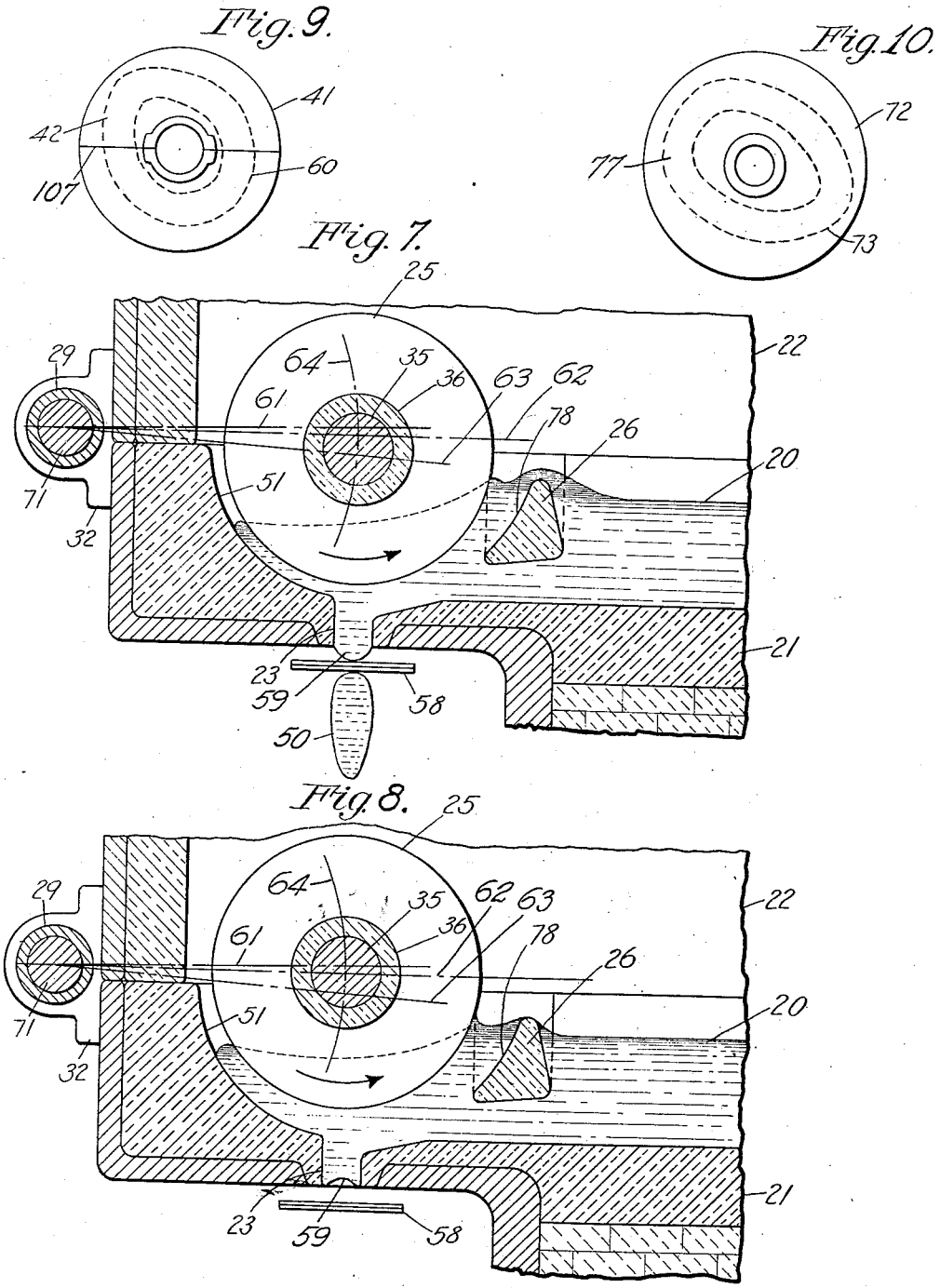
Inventor:
William A. Lorenz
by W. H. Howiss
Att'y.

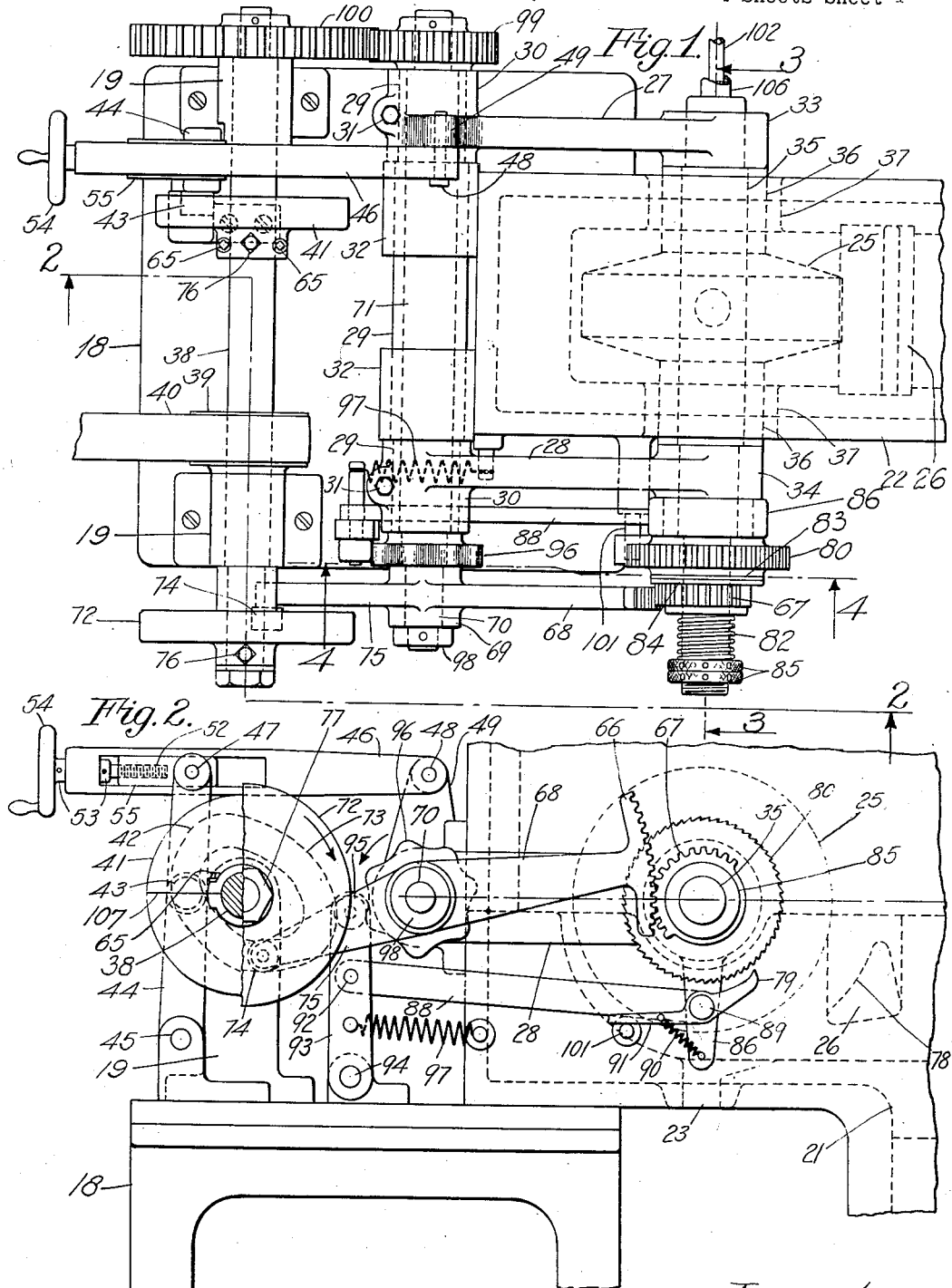

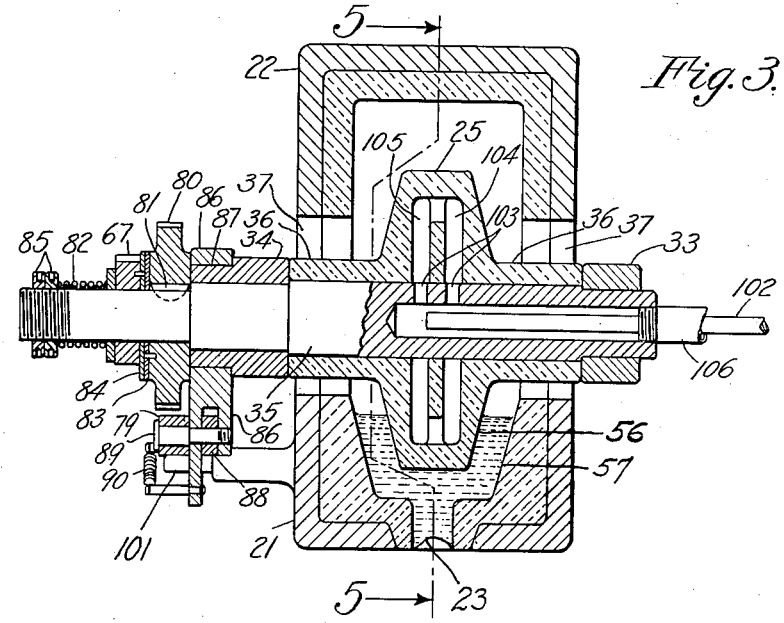
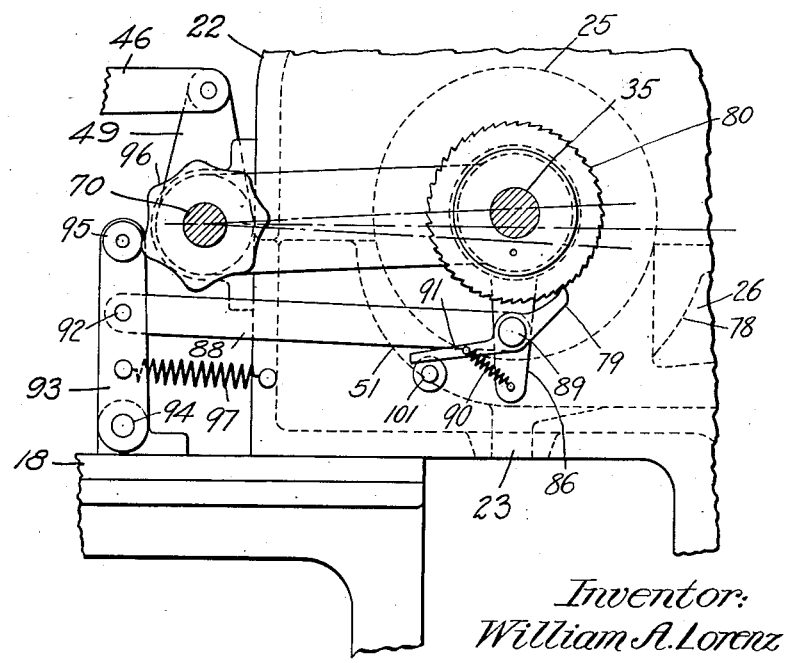

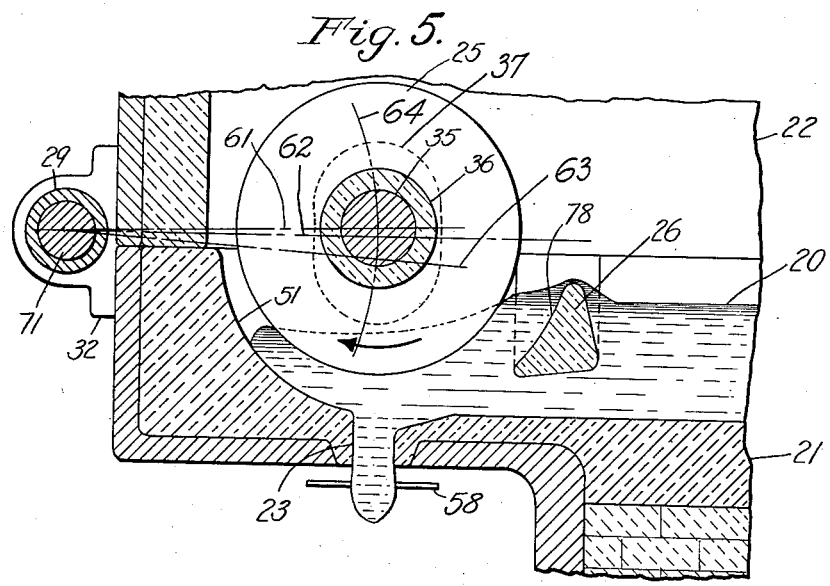
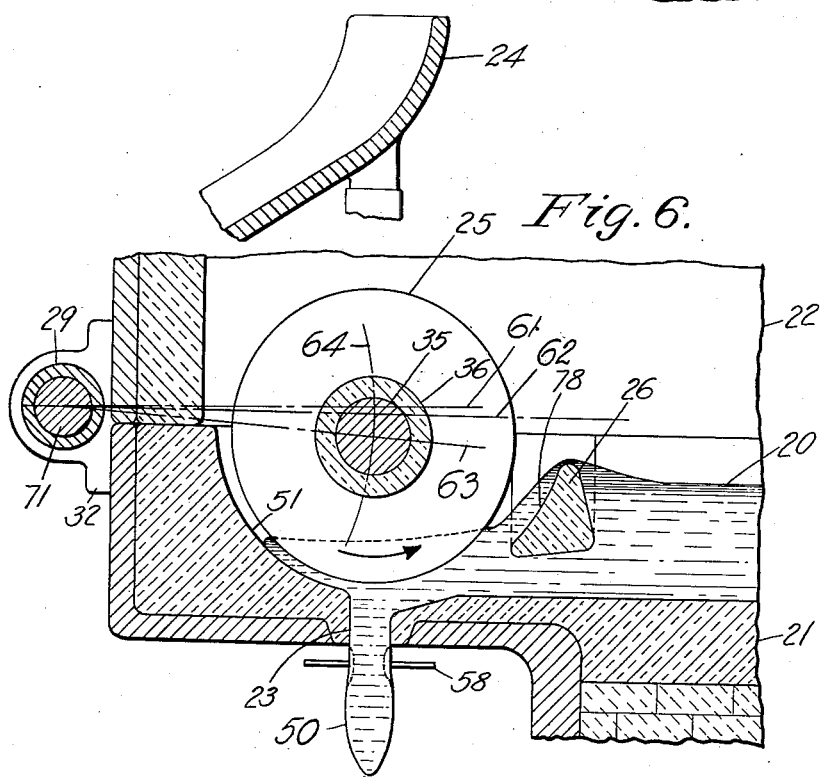

Patented Nov. 4, 1924.

1,514,059

UNITED STATES PATENT OFFICE.

WILLIAM A. LORENZ, OF HARTFORD, CONNECTICUT, ASSIGNOR TO HARTFORD-FAIRMONT COMPANY, OF CANAJOHARIE, NEW YORK, A CORPORATION OF NEW YORK.

APPARATUS FOR SEPARATING MOLTEN GLASS INTO MOLD CHARGES.

Application filed May 3, 1922. Serial No. 558,078.

*To all whom it may concern:*

Be it known that I, WILLIAM A. LORENZ, a citizen of United States, residing at Hartford, in the county of Hartford and State of Connecticut, have invented new and useful Improvements in Apparatus for Separating Molten Glass into Mold Charges, of which the following is a specification.

This invention relates to apparatus for separating molten glass into mold charges, its object being to provide suitable means for obtaining mold charges, either of uniform weights or sizes, or of different weights or sizes, in a desired order of succession from a single feeding machine for regular and continuous delivery to a plurality of molds or shaping machines operating in proper timed relation to the feeder.

In the present invention the molten glass flows from a furnace or other suitable supply source into a container having a submerged outlet, through which the glass is intermittently discharged in pulsatory movements by an impelling device located in the glass above the outlet. For this purpose the impelling device has a periodic movement transversely of or across the outlet to feed the glass thereto, and also has periodic plunging movements or strokes of equal or varying lengths in the desired order of succession, whereby to force regulated quantities of the glass rapidly down through the outlet, beneath which each gather thus expelled is momentarily suspended, until a mold charge is severed from it. Meanwhile the impelling device, by reversal of one or both of its movements above described, retracts or reverses the glass in the outlet. This reversal may begin at or before, or after the severing operation, either to neck or otherwise shape the gather before severance, or to retract the stub during or after severance toward or into the outlet, so as to reheat it and remelt the chilled scar resulting from contact with the shears.

The severed charges may be distributed and delivered to the molds or shaping machines by any suitable delivering apparatus, such as that shown in U. S. Patent 1,264,328 or 1,373,202.

In the drawings:—

Figure 1 is a plan of a machine embodying the invention;

Fig. 2 is a side elevation, partly in section, on line 2—2 of Fig. 1;

Fig. 3 is a transverse sectional elevation on line 3—3 of Fig. 1;

Fig. 4 is a sectional elevation on line 4—4 of Fig. 1;

Figs. 5 to 8 are like sectional elevations on line 5—5 of Fig. 3, showing the impeller at varying distances above the discharge outlet; Fig. 5 showing the impeller in position to move downwardly to force a gather through the outlet; Fig. 6 showing the impeller at the bottom of its stroke with the extruded gather depending from the outlet ready for severing; Fig. 7 showing the impeller after it has moved upwardly a slight distance from its lowermost position; and Fig. 8 showing the impeller nearing the top of its stroke with the stub retracted into the outlet;

Fig. 9 shows a cam for controlling the plunging, or up and down movements of the impeller, and Fig. 10 shows a cam for controlling the oscillation of the impeller transversely of the outlet.

The container 21 for the molten glass 20 is provided with a cover 22, said container having in its bottom a submerged discharge outlet 23, from which the gathers or masses 50 are momentarily suspended for severance by the shears 58, which may be of the type shown in Patent No. 1,264,328, or any other suitable severing device connected in any well known manner to sever the suspended gathers in timed relation to their formation.

A trough 24 is positioned beneath the outlet to receive the severed charges and to form, if desired, a portion of the apparatus for distributing and delivering said charges to the molds or shaping machines.

Across the container adjacent the outlet is a gate 26, which may be positioned at a distance above the bottom of the container to afford an opening of the desired size for the passage of the glass, and for some purposes the said gate may be omitted. The gate, together with the walls of the container, form a basin over the outlet, and in this basin the impeller 25 is mounted for controlling the flow of glass toward the outlet and also its discharge therethrough. The impeller may be in the form of a wheel or segment and may have any desired contour. It is preferably mounted for back and forth rotative movement upon a pair of rocker arms 27 and 28, having bearings 33 and 34 in which the shaft 35 (Fig. 3) is journaled, said shaft extending through the impeller and through its hub-like portions 36, which abut the bearings 33 and 34 as shown. Openings 37 are provided in the walls of the container to afford sufficient clearance for the up and down movement of the hubs of the impeller. The forward ends of the rocker arms 27 and 28 are provided with hubs 30 clamped by means of bolts 31, on a sleeve 29, journaled in bearings 32 on the container.

A shaft 38, mounted in suitable bearings 19 on a frame 18, is provided with a pulley 39 which may be driven by a belt 40. Adjustably secured upon the shaft 38, by means of a set screw 76, is a cam member 41 (Figs. 1 and 9) having a cam path formed with two rises 42 and 60, the cam path being engaged by a roll 43 upon a rock arm 44 pivoted at 45 to a bracket on the frame 19, (Fig. 2). For convenience in changing cams, so that the machine may be used for a variety of work, each cam disk may be diametrically divided along the line 107 (Figs. 2 and 9), the sections being held together by bolts 65 which may also serve to clamp the disk to the drive shaft 38, in which case the set screw 76 may be omitted. The upper end of the rock arm 44 is pivoted at 47 to a block 55 slidably mounted upon a link 46, the link being pivoted at 48 to an extension 49 projecting upwardly from the arm 27. By the mechanism just described, the cam member 41 serves to move the impeller back and forth toward and from the outlet, the strokes of the impeller varying alternately in length by an amount equal to the difference between the cam rises 42 and 60, which in the present case is the distance between the upper and lower radial lines 61 and 62 on the arc 64. The distance between the radial lines 61 and 63, taken on the arc 64, is equal to the longer stroke of the impeller, and the distance between the radial lines 62 and 63 on the arc 64 equals the shorter stroke of the impeller. Thus by alternately varying the strokes of the impeller, the size or weight of the gathers extruded through the outlet will also be varied and the weight of the charges severed at regular intervals at a given plane below the outlet will vary accordingly.

Rotation of the impeller upon its axis, in the direction indicated by the arrow in Fig. 5, is utilized to periodically draw the glass forwardly toward the outlet and into the basin, for subsequent discharge through the outlet by the next downward movement of the impeller. Reverse rotation of the impeller, as indicated by the arrow in Fig. 6, together with its upward movement, may be utilized to retard the flow or to retract the pendant glass, either before or after, or during the severing operation, depending upon whether it is desired to neck or otherwise shape the gather previous to severing, or merely to retract the remnant stub 59 toward or into the outlet to reheat or remelt it, or to prevent the glass from piling on the shears during the severing operation, an example of the necking of the gathers being shown by dotted lines in Fig. 6. Mechanism for imparting the back and forth or rotative movement to the impeller upon the arms or supports 27 and 28, comprises a cam member 72 adjustable on the shaft 38 by means of the set screw 76. The cam member has a cam path engaged by a roll 74 on the forward end 75 of a lever 68 having a hub portion 69 journaled on the reduced end 70 of a shaft 71 projecting through the sleeve 29 (Fig. 1), the lever being held upon the shaft 70 by a nut 98. The lever 68 is provided with a sector 66 meshing with a pinion 67 on the impeller shaft 35, said shaft and the impeller thereon being oscillated by the rocking of the lever. Secured to the pinion 67 is a driving disk 84, in engagement with a similar disk 83 fixed on the ratchet wheel 80 which is keyed at 81 to the impeller shaft 35. A spring 82, interposed between the pinion and the adjustable nuts 85, serves to maintain the disk 84 in driving engagement with the disk 83, adjustment of the nuts serving to properly tension the spring 82. The cam path of the cam member 72 (Figs. 1 and 10) is preferably provided with two rises 73 and 77, corresponding approximately to the rises of the cam member 41, so as to give alternate long and short rotative movements to the impeller back and forth transversely of and across the outlet, the longer movement being preferably employed in feeding the glass toward the outlet with the impeller moving in the direction indicated by the arrow in Fig. 5. Rotation of the impeller in the opposite direction as indicated in Figs. 6 to 8, may begin about the time it reaches its lowermost position and may continue during the greater part of its upward stroke, at which time the stub is retracted toward or drawn into the outlet. Rotation of the impeller in the direction indicated by the arrow in Fig. 5, to feed the glass to the outlet, may begin at or about the time the impeller reaches its uppermost position. The timing of the reversal periods, as controlled by the cam member 72, may be varied with respect to the plunging periods, or the up and down movements of the impeller, by adjusting either of the cam members 41 or 72 on the shaft 38. The number and extent of the rises for the cam path of the member 72 may be increased or decreased to agree with those of the cam member 41, or otherwise varied to produce the desired results.

If it is desired to increase the number of charges to be produced in a given cycle, the cam 41 may be removed and another substituted therefor having the proper number of rises of the desired proportions. Likewise, if it is deemed advisable to produce charges of equal sizes in succession, a cam may be provided, proportioned to give the desired number of charges for each revolution of the shaft 38.

Regulation of the extent of the downward movement of the impeller is provided for, so as to permit variation of the distance between the outlet and the bottom of the impeller when in its lowermost position. Such regulation is effected by a feed screw 52, held against longitudinal movement by the collars 53, the screw being turned by rotation of the handle 54 to lengthen or shorten the link 46 (Fig. 2).

The bottom of the container may be curved, as at 51, and the gate 26 as at 78, to conform to the curvature of the impeller, and the beveled sides 57 of the container may be inclined to correspond to the inclination of the beveled sides 56 of the impeller, as in Fig. 3. The effectiveness of the impeller is increased by the action of its beveled sides as well as by its peripheral surface.

Means is provided for progressively advancing the impeller step by step about its axis, in order to maintain uniform temperatures in all parts of the impeller when in operation. This rotation or creeping of the impeller is effected by a driving pawl 79 through the ratchet wheel 80 keyed at 81 on the impeller shaft 35. The pawl 79 is carried by an arm 86 journaled upon a projecting portion 87 of the bearing 34, and this arm is rocked by means of a link 88 (Figs. 2 and 4) which may have the same pivot pin 89 that carries the pawl 79. The pawl is provided with a returning spring 90, connected at one end to the arm 86 and at the other to a heel 91 on the pawl. The link 88 is pivoted at 92 to a vertical lever 93 which is pivoted at 94 to a bracket on the frame 10. The upper end of the lever 93 is provided with a roll 95 which follows successive elevations and depressions on a cam disk 96, driven by the shaft 71 carrying a pinion 98 meshing with a gear 100 on the cam shaft 38. A spring 97 serves to hold the roll 95 in contact with the cam disk 96. Progressive advancement of the impeller 25 is preferably effected when it is in or near its uppermost position, the pawl 79 being thrown out of engagement with the ratchet wheel 80 during the downward stroke of the impeller, through engagement of the heel portion 91 of the pawl with a stop 101 projecting from the container.

The shaft 35 and the impeller thereon, may be cooled by admitting water or other cooling fluid through a pipe 102 and passages 103 leading to communicating chambers 104 and 105 formed in the center of the impeller. The heated fluid may escape through the pipe 106, surrounding the inlet pipe 102.

The delivery of mold charges varying in weight in a cyclic order is not claimed broadly herein, since this feature of the invention is claimed in my copending applications for Letters Patent Serial Nos. 549,447, 549,448, 549,449 and 549,450, all filed April 4, 1922, and Serial No. 467,154, filed May 5, 1921.

The illustrated embodiment of the invention may be modified in construction, arrangement and mode of operation to a considerable extent without departing from the scope of the invention as defined by the appended claims.

I claim:—

1. Apparatus for segregating molten glass in mold charges, comprising a container having a discharge outlet, an impeller movable in one direction to feed the glass toward the outlet, and also movable in a different direction to discharge through the outlet a portion of the glass so fed, and means for actuating the impeller.

2. Apparatus for segregating molten glass in mold charges, comprising a container having a discharge outlet, an impeller periodically movable toward the outlet to discharge gathers of glass therethrough, and also movable transversely of the outlet to retard the glass therein at intervals between discharge periods, and means for actuating the impeller.

3. Apparatus for segregating molten glass in mold charges, comprising a container having a discharge outlet, an impeller periodically movable toward the outlet to discharge gathers of glass therethrough, and also movable in opposite directions transversely of the outlet to alternately retard the glass in the outlet and to accumulate additional glass adjacent the outlet between discharge periods, and means for actuating the impeller.

4. Apparatus for segregating molten glass in mold charges, comprising a container having a submerged outlet, an impeller mounted within the container for periodic movement transversely of the outlet to feed glass thereto and for movement longitudinally of the outlet to effect the discharge of gathers varying in weight in a cyclic order, and means for imparting the different movements to the impeller at the desired times.

5. Apparatus for segregating molten glass in mold charges, comprising a container having a submerged outlet, an impeller mounted within the container for movement in opposite directions transversely of the outlet to alternately feed glass thereto and to retard its movement therethrough, and means for moving the impeller longitudinally of the outlet to effect the discharge of gathers varying in weight in a cyclic order.

6. Apparatus for segregating molten glass in mold charges, comprising a container having a discharge outlet, an impeller movable within the container toward the outlet to effect the periodic discharge of gathers therethrough varying in weight in a cyclic order, the impeller being movable transversely of the outlet to feed the glass thereto, and means for imparting the different movements to the impeller.

7. Apparatus for segregating molten glass in mold charges, comprising a container having a discharge outlet, an impeller movable within the container toward the outlet to effect the periodic discharge of gathers therethrough varying in weight in a cyclic order, the impeller being also movable at intervals in a direction transverse to the outlet to reverse the flow of glass therein, and means for imparting the said movements to the impeller.

8. Apparatus for segregating molten glass in mold charges, comprising a container having a discharge outlet, an impeller movable within the container toward and from the outlet to effect the periodic discharge of gathers therethrough varying in weight in a cyclic order, the impeller being also arranged for oscillation transversely of the outlet to alternately feed glass thereto and to retard its movement therein, and means for imparting the said movements to the impeller at the desired times.

9. Apparatus for segregating molten glass in mold charges, comprising a container having a discharge outlet, an impeller movable periodically in one direction to discharge gathers of glass through the outlet and transversely thereof to retard the glass therein, severing means for the gathers, arranged to operate in timed relation to the retarding periods, and means for effecting operation of the impeller and severing means.

10. Apparatus for segregating molten glass in mold charges, comprising a container having a submerged outlet, an impeller movable within the container toward and from the outlet to effect the periodic discharge of gathers therethrough varying in weight in a cyclic order, the impeller being also movable at intervals in a direction transverse to the outlet to reverse the glass therein, severing means for the gathers arranged to operate at or subsequent to the reversal periods, and means for effecting operation of the impeller and severing means in proper timed relation.

11. Apparatus for segregating molten glass in mold charges, comprising a container having a submerged outlet, an impeller positioned in the container over the outlet, an oscillatory support for the impeller on which the latter is rotatably mounted, and means for oscillating the support and for imparting independent rotative movement to the impeller thereon.

12. Apparatus for segregating molten glass in mold charges, comprising a container having a submerged outlet, an impeller positioned in the container over the outlet, an oscillatory support for the impeller on which the latter is rotatably mounted, and means for oscillating the support and for imparting a back and forth movement to the impeller upon the support.

13. Apparatus for segregating molten glass in mold charges, comprising a container having a submerged outlet, an impeller positioned in the container over the outlet and movable to periodically discharge gathers of glass therethrough, an oscillatory support for the impeller on which the latter is adapted to rotate to reverse the flow of glass in the outlet at intervals timed with respect to the discharge periods, severing means below the outlet timed with respect to the reversal periods to sever the gathers suspended from the outlet, and means for imparting the said movements to the support, the impeller thereon and the severing means.

14. Apparatus for segregating molten glass in mold charges, comprising a container having a submerged outlet, an impeller positioned in the container over the outlet, a support for the impeller on which the latter is mounted for movement back and forth transversely of the outlet, an operating device for moving the support and the impeller thereon toward and from the outlet, and an operating device for moving the impeller back and forth on the support, one of said devices being adjustable relative to the other to vary its time of operation.

15. Apparatus for segregating molten glass in mold charges, comprising a container having a submerged outlet, an impeller positioned in the container over the outlet, a support for the impeller on which the latter is mounted for back and forth movement, an operating device for moving the support and the impeller thereon toward and from the outlet, an operating device for moving the impeller back and forth on the support, and common means for actuating said devices in timed relation.

16. Apparatus for segregating molten glass in mold charges, comprising a container having a submerged outlet, and impeller positioned in the container over the outlet, for discharging gathers therethrough, a support for the impeller on which the latter is mounted for back and forth movement, an operating device for moving the support and the impeller thereon toward and from the outlet, an operating device for moving the impeller back and forth on the support, means for actuating said devices in time relation, and severing means below the outlet for operation at intervals in timed relation to the discharge periods.

17. Apparatus for segregating molten glass in mold charges, comprising a container having a submerged outlet, an impeller positioned in the container over the outlet for discharging gathers of glass therethrough, a support for the impeller on which the latter is mounted for back and forth movement, means for moving the impeller back and forth on the support to control the movement of the glass in and adjacent the outlet between discharge periods, and means for periodically moving the support to different distances above the outlet in a given cycle, whereby to discharge the glass in masses of different predetermined weights during said cycle.

18. Apparatus for segregating molten glass in mold charges, comprising a container having a submerged outlet, an impeller positioned within the container over the outlet, means for moving the impeller toward and from the outlet to different distances therefrom in a given cycle, whereby to discharge the glass in masses of different predetermined weights during said cycle, and means for moving the impeller transversely of the outlet to control the movement of the glass in and adjacent the outlet.

19. Apparatus for segregating molten glass in mold charges, comprising a container having a submerged outlet, an impeller positioned within the container over the outlet, means for moving the impeller back and forth to different distances from the outlet in a given cycle, whereby to effect a predetermined variation in the weights of the gathers discharged during said cycle, and means for moving the impeller back and forth independently of the last mentioned movements to alternately feed glass to the outlet and to reverse its movement therein between discharge periods.

20. Apparatus for segregating molten glass in mold charges, comprising a container having a submerged outlet, a support positioned adjacent the outlet for back and forth movement, an impeller mounted upon the support adjacent the outlet and movable about an axis on the support, means for effecting back and forth movement of the support to periodically move the impeller toward and from the outlet, and means for moving the impeller about said axis.

21. Apparatus for segregating molten glass in mold charges, comprising a container having a submerged outlet, a support mounted for back and forth movement toward and from the outlet to different distances therefrom in a given cycle, an impeller mounted upon the support adjacent the outlet and movable about an axis on the support, means for effecting back and forth movement of the support, and means for moving the impeller about said axis to control the glass in and adjacent the outlet.

22. Apparatus for segregating molten glass in mold charges, comprising a container having a submerged outlet, a rocking device, an impeller mounted adjacent the outlet, for rotation upon the rocking device, means for actuating the rocking device to move the impeller toward and from the outlet, and means for imparting progressive rotative movement to the impeller upon the rocking device.

23. Apparatus for segregating molten glass in mold charges, comprising a container having a submerged outlet, a rocking device, an impeller mounted adjacent the outlet for advancement about an axis upon the rocking device, means for actuating the rocking device to move the impeller toward and from the outlet, and means for advancing the impeller step by step about said axis.

24. Apparatus for segregating molten glass in mold charges, comprising a container having a submerged outlet, a rocking device, an impeller mounted adjacent the outlet for oscillation about an axis upon the rocking device and for progressive advancement around said axis, means for actuating said rocking device to move the impeller toward and from the outlet, and means for effecting the progressive movement of the impeller and for oscillating it about said axis.

25. Apparatus for segregating molten glass in mold charges, comprising a container having a submerged outlet, a rocking device, an impeller mounted adjacent the outlet, for intermittent advancement about an axis on the rocking device, means for periodically moving the rocking device to move the impeller toward and from the outlet, means for intermittently advancing the impeller about said axis when in one position above the outlet, and means for rendering said advancing means inoperative when the impeller is in another position above the outlet.

26. Apparatus for segregating molten glass in mold charges, comprising a container having a submerged outlet, a support mounted for back and forth movement toward and from the outlet, an impeller mounted upon the support adjacent the outlet for advancement about an axis on the support, means for effecting back and forth movement of the support, and means for progressively advancing the impeller around said axis at its successive movements.

27. Apparatus for segregating molten glass in mold charges, comprising a container having a submerged outlet, a support mounted for back and forth movement toward and from the outlet, an impeller mounted adjacent the outlet, for oscillation upon the support, a cam operatively connected with said support, a cam operatively connected with the impeller to effect oscillation thereof upon said support, one of said cams being adjustable relative to the other, and means for operating said cams.

28. Apparatus for segregating molten glass in mold charges, comprising a container having a submerged outlet, an impeller positioned in the container adjacent the outlet, an arm adapted to support the impeller, a lever spaced from said arm, a link, including an adjustable portion forming an operating connection between said arm and lever, a cam operatively connected with the lever, and means for actuating the cam.

29. Apparatus for segregating molten glass in mold charges, comprising a container having a submerged outlet, a rocking device, an impeller mounted within the container adjacent the outlet for oscillation upon said rocking device, a gear connected with the impeller, a sector meshing with the gear, means for oscillating the sector, and means for actuating the rocking device.

30. Apparatus for segregating molten glass in mold charges, comprising a container having a submerged outlet, a rocking device, an impeller mounted within the container adjacent the outlet for back and forth movement upon the rocking device, a second rocking device for imparting the back and forth movement to the impeller, and means for actuating said rocking devices.

31. Apparatus for segregating molten glass in mold charges, comprising a container having a submerged outlet, a rocking device, an impeller mounted within the container adjacent the outlet for back and forth movement upon said rocking device, a second rocking device for imparting the back and forth movement to the impeller, a drive shaft, and cams on said drive shaft operatively connected with said rocking devices.

32. Apparatus for segregating molten glass in mold charges, comprising a container having a submerged outlet, a support mounted for back and forth movement toward and from the outlet, an impeller mounted for advancement about an axis on the support, a pawl and ratchet mechanism for advancing the impeller, means for actuating said mechanism, and means for moving the support to move the impeller toward and from the outlet.

33. Apparatus for segregating molten glass into mold charges, comprising a container having a submerged outlet, a drive shaft, a driven shaft connected with the drive shaft, a sleeve surrounding said driven shaft, a rocking device pivoted upon said sleeve, an impeller rotatably mounted on said rocking device adjacent to the outlet, means on said drive shaft for oscillating said rocking device to move the impeller toward and from the outlet, a pawl and ratchet mechanism for advancing the impeller step by step about its axis of rotation, a second rocking device for actuating said pawl and ratchet mechanism, and a member mounted on said driven shaft for actuating said second rocking device.

34. Apparatus for segregating molten glass in mold charges, comprising a container having a submerged outlet, an impeller positioned adjacent the outlet, a rocking device on which the impeller is mounted for oscillation, a pinion connected with the impeller, a pivoted sector for actuating the pinion, a drive shaft, and cams on said drive shaft, one connected to said rocking device and the other to said sector, each of said cams being adapted to give the impeller alternately longer and shorter strokes.

35. Apparatus for segregating molten glass in mold charges, comprising a container having a discharge outlet, a feed wheel mounted in the container adjacent the outlet, power driven means for raising and lowering the wheel, and means for effecting to and fro movements of said wheel.

36. Apparatus for segregating molten glass in mold charges, comprising a container having a discharge outlet, a feed wheel mounted in the container adjacent the outlet, power driven means for moving the wheel toward and from the outlet, and means for effecting a progressive rotation of the wheel.

37. Apparatus for segregating molten glass in mold charges, comprising a container having a discharge outlet, a feed wheel mounted in the container adjacent the outlet, power driven means for moving the wheel toward and from the outlet, means for moving said wheel to and fro transversely of the outlet and means for effecting intermittent rotation of the wheel in a single direction.

38. Apparatus for segregating molten glass in mold charges, comprising a container having a discharge outlet, a feed wheel mounted in the container adjacent the outlet, and power driven means for imparting a to and fro movement to the wheel.

39. Apparatus for segregating molten glass in mold charges, comprising a container having a discharge outlet, a feed wheel mounted in the container adjacent the outlet, means for imparting to and fro movements to the wheel, and means for effecting rotation of the wheel in a single direction.

40. Apparatus for segregating molten glass in mold charges, comprising a container having a submerged outlet, a feeding device within the container arranged for variable plunging movements toward the outlet and for variable movements transversely thereof, and means for imparting the said movements to the feeding device.

41. Apparatus for segregating molten glass in mold charges, comprising a container having a discharge outlet, an impeller mounted in the container adjacent the outlet, power driven means for periodically moving the impeller in opposite directions to different distances from the outlet in a given cycle, and means for moving the impeller step by step in a single direction.

42. Apparatus for segregating molten glass into mold charges, comprising a container having a discharge outlet, a gate in the container adjacent the outlet for regulating the flow of glass to the outlet, an impeller mounted within the container over the outlet, means for moving the impeller in one direction to periodically feed glass under the gate toward the outlet, and means for moving the impeller in a different direction to effect the periodic discharge of gathers through the outlet.

43. Apparatus for segregating molten glass into mold charges, comprising a container having a discharge outlet, a gate within the container adjacent the outlet, forming with the walls of the container a basin over the outlet, an impeller within the basin, means for moving the impeller transversely of the outlet to periodically draw glass under the gate into the basin, and means for moving the impeller toward the outlet to periodically discharge gathers of glass therethrough.

Signed at Hartford, Conn., this 1st day of May, 1922.

WILLIAM A. LORENZ.